United States Patent
Yin

(10) Patent No.: US 12,170,924 B2
(45) Date of Patent: Dec. 17, 2024

(54) SYSTEMS AND METHODS FOR OPTIMIZING NETWORK TRANSMISSIONS

(71) Applicant: N-Hop Technologies Limited, New Territories (HK)

(72) Inventor: Ho Fai Hoover Yin, New Territories (HK)

(73) Assignee: n-hop technologies Limited, Pak Shek Kok (HK)

( * ) Notice: Subject to any disclaimer, the term of this patent is extended or adjusted under 35 U.S.C. 154(b) by 389 days.

(21) Appl. No.: 17/725,524

(22) Filed: Apr. 20, 2022

(65) Prior Publication Data

US 2023/0345301 A1 Oct. 26, 2023

(51) Int. Cl.
*H04W 28/06* (2009.01)

(52) U.S. Cl.
CPC .................................. *H04W 28/06* (2013.01)

(58) Field of Classification Search
CPC ..... H04W 28/06; H04L 1/0007; H04L 47/365
See application file for complete search history.

(56) References Cited

U.S. PATENT DOCUMENTS

| 2007/0097985 | A1* | 5/2007 | Lee | ......................... | H04W 8/04 |
| | | | | | 370/352 |
| 2021/0037559 | A1* | 2/2021 | Hande | ..................... | H04L 67/06 |

OTHER PUBLICATIONS

Compta, P. T. et al. "Network Coding is the 5G Key Enabling Technology: Effects and Strategies to Manage Heterogeneous Packet Lengths," Transactions on Emerging Telecommunications Technologies, vol. 26, Issue 1, Jan. 2015, 10 pages.

Schutz, B. et al. "Packet-Preserving Network Coding Schemes for Padding Overhead Reduction," 2019 IEEE 44th Conference on Local Computer Networks (LCN), IEEE, Oct. 2019, 8 pages.

Taghouti, M. et al. "Reduction of Padding Overhead for RLNC Media Distribution With Variable Size Packets," IEEE Transactions on Broadcasting, vol. 65, No. 3, Sep. 2019, 19 pages.

European Patent Office, Communication, Extended Search Report issued for European Patent Application No. 23169069.4, dated Sep. 15, 2023, 10 pages.

* cited by examiner

*Primary Examiner* — Derrick V Rose
(74) *Attorney, Agent, or Firm* — Norton Rose Fulbright US LLP

(57) ABSTRACT

Batched network coding (BNC) is a low-complexity solution to network transmission in multi-hop networks with packet loss that divides data to be transmitted into multiple packets and pads the data when necessary. However, an inappropriate choice of packet size leads to a significant overhead. Embodiments of the present disclosure provide systems, methods, and apparatuses that overcome the shortcomings of traditional BNC solutions by dynamically deciding a packet size through optimization of the overhead. As a result, embodiments of the present disclosure boost throughput of systems leveraging BNC transmission techniques by providing file-specific and dynamically determined optimizations. The disclosed techniques for performing dynamic optimization of transmissions also reduce computational complexity, enabling use case deployments in which nodes having reduced computational resources and power requirements are utilized while maintaining improved performance of the network (e.g., in terms of throughput, etc.).

20 Claims, 8 Drawing Sheets

SYSTEMS AND METHODS FOR OPTIMIZING NETWORK TRANSMISSIONS

TECHNICAL FIELD

The present disclosure generally relates to communications and more specifically to systems and methods for optimizing data transmissions to reduce overhead and increase throughput of networks.

BACKGROUND

Interest in multi-hop wireless networks has become a subject of interest recently due to their potential to support certain use cases for wireless connectivity, such as smart city and Internet-of-Things (IoT) applications. To support such use cases many devices or nodes may be utilized to cover a desired area, such as a city, a building (e.g., a factory or manufacturing facility, an office building, a warehouse, etc.), or other area. Since smart city and other use cases may require a large number of nodes to provide effective coverage of the desired environment, the nodes used in the multi-hop networks tend to be lower cost devices that have fewer computational resources (e.g., computational resources, memory resources, and the like) as compared to other types of networks and applications (e.g., cellular communications).

Due to the relatively lower computing resources typically found in nodes used for many multi-hop network use cases, factors that negatively impact the performance of wireless communications may have a great impact. For example, packet loss is a common phenomenon on wireless links because wireless links are easily interfered by other wireless signals and environment factors (e.g., buildings, vehicles, frequency modulated (FM) radio signals, or other factors). Traditional network transmission approaches utilizing forwarding and end-to-end retransmission, such as those used in Wireless Fidelity (Wi-Fi) or other types of networks, do not perform well in multi-hop wireless networks. This is because a packet must be transmitted successfully on all the links in order to reach its destination, but the probability of a packet reaching its destination diminishes exponentially fast as the number of hops increases. It is noted that the term file is used herein, for simplicity, to refer to the data to be transmitted. However, it is to be understood that the term data, as used herein, is not restricted to a file in the sense of file system. For example, the data can be the captured network traffic in a short timeframe or parts of a real-time stream.

Several approaches have been developed to address packet loss in networks, such as random linear network coding (RLNC) and batched network coding (BNC). For many scenarios RLNC can be used for network coding and achieve the capacity of networks subject to packet loss. The simplest RLNC scheme can be described as:

(1) A source node (e.g., the node originating the transmission) divides the file into multiple parts of the same length, where each part is called an input packet, and the input packets are padded with arbitrary symbols (e.g., zeros) when necessary to achieve the same length.

(2) The source node transmits random linear combinations of the input packets.

(3) Each packet generated by the source using RLNC has a coefficient vector attached, which records the coefficients of the linear combinations during the transmission (i.e., the way to form this packet).

(4) Each intermediate node (i.e., nodes other than the source node or destination of the packet that receive and retransmit the packets generated by the source node) transmits random linear combinations of the packets it has received. The destination node recovers the input packets by solving the equations given by the coefficient vectors.

Once the destination node has received enough packets with linearly independent coefficient vectors, all the input packets can be recovered. In this manner, the network code itself plays the role of an end-to-end erasure correction code so that packet loss can be handled.

In the exemplary description of how RLNC can be used to transmit data in multi-hop networks, the input packet length has a significant impact to the overall network performance. In particular, an inappropriate length requires many arbitrary symbols to be padded to the file which consumes bandwidth and hence impairs the throughput. This type of padding overhead is known as the zero-padding overhead. For RLNC-based implementations, the throughput can easily drop to less than 50 percent when the file size is small, meaning that much of the throughput is being used to transport meaningless information (e.g., zero padding). However, small file sizes may be used in many emerging applications where multi-hop networks are contemplated for use, such as real-time communication, wireless sensor networks and remote command links, and the like. Due to the likelihood of small file size, using RLNC in such networks may result in poor performance.

Besides the input packet length issue, there are some complexity issues that need to be considered when implementing the above RLNC scheme for real systems, including: (1) the computational cost of encoding and decoding; (2) the storage and computational cost at the intermediate nodes; (3) the overhead for transmitting the coefficient vectors and the headers of the protocols for network transmission. One method to resolve the above issues is BNC, which applies network coding to a small subset of the coded packets generated from the input packets. In BNC implementations the encoder of the source node generates batches, each containing a set of coded packets, and transmits the batches to a destination node via intermediate nodes of the network. At each intermediate node, network coding is applied to the packets belonging to the same batch, which is a process known as recoding. During recoding, only the coefficients of the linear combinations belonging to the same batch need to be tracked in the coefficient vectors, which reduces a size of the coefficient vector, and allows it to be independent of the number of input packets.

Like RLNC, the input packet length issue has a significant impact on the performance of BNC. Besides the zero-padding overhead issue described above, BNC induces another type of padding overhead, referred to as batch-padding overhead. While a source node using RLNC can accurately generate and transmit the required amount of redundancy (i.e., the extra number of packets needed to combat packet loss), in BNC the required amount of redundancy may lead to an incomplete batch. The batch-padding overhead is the number of packets generated in order to fill up this incomplete batch. Thus, a main difference between the zero-padding overhead of RLNC, which will referred to as "file-padding overhead" below to avoid confusion with other types of overheads, and the batch-padding overhead of BNC is that batch-padding overhead is a type of redundancy which can help decoding. However, like file-padding overhead, the batch-padding overhead can be large when transmitting small file sizes, thereby degrading network performance (e.g., throughput).

As shown above, the input packet size can have a significant impact on the performance (e.g., throughput) of networks utilizing RLNC and BNC. There are two additional factors that should be considered when finding a suitable input packet size. The first one is the protocol overhead per packet induced by BNC and other protocol headers for network transmission. Unlike file-padding overhead and batch-padding overhead, which depend on the amount of information available for inclusion in the payload of the input packets, protocol overhead does not change from one packet to another. Thus, the input packet size cannot be too small, otherwise the protocol overhead is too large. The second factor is the maximum input packet size. For example, Ethernet restricts the size of Internet Protocol (IP) packets using a maximum transmission unit (MTU), which requires that any packets larger than MTU must be fragmented. In multi-hop networks a file is processed (e.g., using RLNC, BNC, etc.) by a source node to generate one or more input packets and the input packet(s) are transmitted to a destination node via one or more intermediate nodes of the multi-hop network. The input packet(s) pertaining to the file hop from node-to-node and recoding needs to be performed on the packets at zero or more intermediate nodes (e.g., nodes between the source node and the destination). The recoding process represents a trade-off between the throughput of the network and increasing the computational cost imposed on the nodes of the network. Furthermore, if one or more fragments are lost, then the packet cannot be reassembled for recoding. Eventually, fragmentation increases the packet loss rate which can be avoided, at least in part, by upper bounding the input packet size.

As can be appreciated from the foregoing, there are various factors that may impact the performance of multi-hop networks and those factors may impose design constraints that limit the ability to deploy multi-hop networks in some instances. For example, limited computational resource nodes may be well-suited for many multi-hop network-based use cases due to their smaller form factors and low cost of deployment, but the limited computational resources may result in poor performance when fragmentation is used (e.g., due to the higher computational complexity required to reassemble the packets during recoding). Additionally, for multi-hop network use cases where small file sizes may be common (e.g., sensor networks, etc.), file-padding overhead and batch-padding overhead may reduce overall network performance. Thus, it should be appreciated that the different types of overheads described above interact with each other, creating a joint optimization problem (e.g., how to minimize the number of symbols to be transmitted) that remains unsolved.

SUMMARY OF THE INVENTION

Embodiments of the present disclosure provide systems, methods, apparatuses, and techniques for dynamic optimization of transmissions in a network. To facilitate optimizations, nodes of a network may be provided with an optimization engine providing functionality for dynamic optimization of transmissions. When a file is received by a node of the network for transmission, the node may invoke the functionality of the optimization engine prior to encoding (e.g., using a BNC encoder, etc.) the file for transmission. To dynamically optimize the transmission for the specific file to be transmitted, the node may pass the optimization engine a set of parameters specific to the file to be transmitted (e.g., a size of the file, a protocol to be used, and the like).

Once initialized, the optimization engine may utilize the set of parameters to initialize a process configured to optimize the transmission in a manner that is specifically tuned to the file to be transmitted, thereby enabling the optimizations to account for differences in file sizes and other attributes or characteristics of the file, rather than relying on static configurations of the above-described techniques or other rigid configuration techniques. In some aspects, the optimization process may be performed in an iterative manner in which the optimization engine optimizes one aspect of the transmission (e.g., the number of packets to be generated) and then uses that optimization to optimize another aspect (e.g., the batch rate). The iterative process may involve several iterations to refine and tune the optimizations prior to transmitting the file. In additional or alternative aspects the optimization process may be performed in a non-iterative fashion.

During the optimization process, factors such as the number of packets to be generated (e.g., to enable recovery of the file once a sufficient number of packets has been received), a batch rate, coding overhead, protocol overhead, file-padding overhead, and batch-padding overhead may be considered and optimized. In some aspects, the optimizations may also take into account other types of information, such as batch statistics, historic network data, etc. Once the transmission has been optimized, a set of optimized configuration parameters may be output by the optimization engine and used to encode and transmit the file on the network. In an aspect, a BNC encoder may be used to transmit the file according to the optimized set of parameters. Once transmitted by a source node, the file, which has been encoded into batches of input packets according to the set of optimized parameters output by the optimization engine, may be received by an intermediate node. The intermediate nodes may perform recoding on each batch individually, which allows recoding to be performed more quickly, and the destination for the transmission may recover the file once a sufficient number of input packets have been received.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF DRAWINGS

For a more complete understanding of the present disclosure, reference is now made to the following descriptions taken in conjunction with the accompanying drawings, in which.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Figure 1:
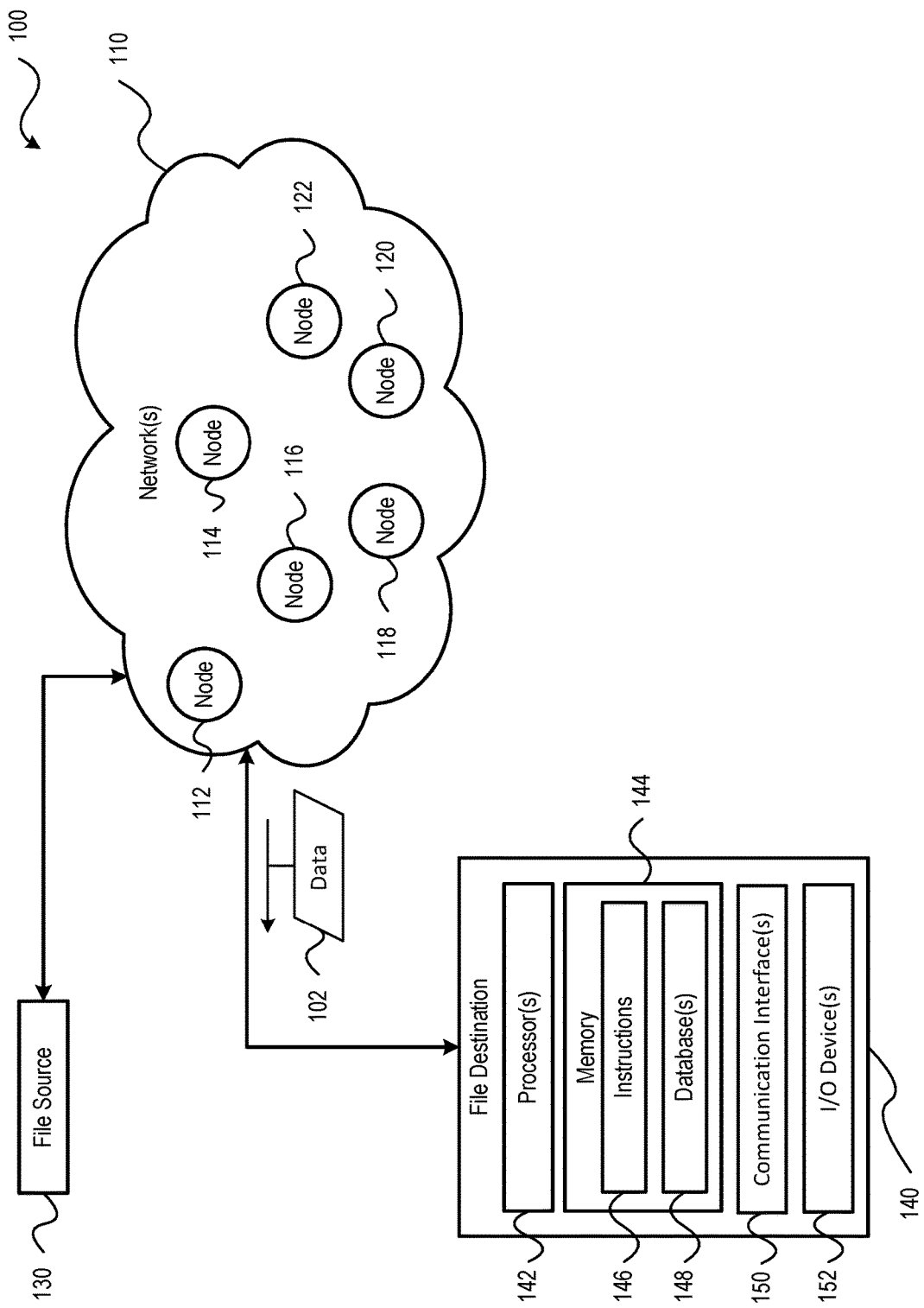
FIG. 1 shows a block diagram of a system in accordance with aspects of the present disclosure.

Referring to FIG. 1, a block diagram of a system in accordance with aspects of the present disclosure is shown as a system 100. The system 100 provides functionality for improving network performance (e.g., network throughput) through dynamic optimization of transmission parameters used to transmit files, as described in more detail below. As shown in FIG. 1, the system 100 includes a network 110 including a plurality of nodes 112-122. The network 110 may be a multi-hop network in which files are transmitted through the network 110 via multiple hops between the nodes 112-122. For example, a file 102 may be transmitted from a source node to a computing device 140 via the network 110. It is noted that while the file 102 is shown in FIG. 1 as a single logical block, such depiction has been provided for purposes of illustration, rather than by way of limitation and as will be described in more detail below, the file 102 may be transmitted as a series of input packets, which may be batched using a BNC encoder/recorder in accordance with the concepts described herein. In some aspects, the file 102 may be generated based on information associated with another device, such as a file source device 130, which can be a machine, a sensor, or any other kind of device.

As shown in FIG. 1, the computing device 140 includes one or more processors 142, a memory 144, one or more communication interfaces 150, and one or more input/output (I/O) devices 152. The one or more processors 142 may include one or more microcontrollers, application specific integrated circuits (ASICs), field programmable gate arrays (FPGAs), central processing units (CPUs) and/or graphics processing units (GPUs) having one or more processing cores, or other circuitry and logic configured to facilitate the operations of the computing device 140 in accordance with aspects of the present disclosure. The memory 144 may include random access memory (RAM) devices, read only memory (ROM) devices, erasable programmable ROM (EPROM), electrically erasable programmable ROM (EE-PROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the computing device 140 may be stored in the memory 144 as instructions 146 that, when executed by the one or more processors 142, cause the one or more processors 142 to perform the operations described herein with respect to the computing device 140. Additionally, the memory 144 may be configured to store information in one or more databases 148.

The one or more communication interfaces 150 may be configured to communicatively couple the computing device 140 to the one or more networks, such as the network 110, via wired or wireless communication links established according to one or more communication protocols or standards (e.g., Ethernet, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, Bluetooth Low Energy (BLE), and the like). The one or more I/O devices may include one or more display devices, a keyboard, a stylus, one or more touchscreens, a mouse, a trackpad, a microphone, a camera, one or more speakers, haptic feedback devices, or other types of devices that enable a user to receive and/or view information and to provide information to the computing device 140. In some implementations, the computing device 140 is coupled to the display device, such as a monitor, a display (e.g., a liquid crystal display (LCD) or the like), a touch screen, a projector, a virtual reality (VR) display, an augmented reality (AR) display, an extended reality (XR) display, or the like. In some other implementations, the display device is included in or integrated in the computing device 140.

To facilitate transmission of the file 102 to the computing device 140 via the network 110, the file may be broken down into a set of input packets and then batches the input packets included in the set of input packets may be encoded by the source node for transmission over the network 110. As a non-limiting and illustrative example, suppose that the node 112 is the source node. To generate the set of input packets and then transmit the batches of the input packets (e.g., using a BNC encoder operating in accordance with the present disclosure) to the computing device 140, the node 112 may determine a set of optimization parameters for optimizing the transmission. To facilitate determining the set of optimization parameters, the node 112 (and other nodes of the network 110) may include an optimization engine configured to receive a set of input parameters for the file to be transmitted and then use the input parameters to determine the set of optimized parameters for transmitting the file as batches of the input packets.

In an aspect, the optimization process performed by the optimization engine may receive a set of configuration parameters derived from the file 102, the network 110, and/or other sources. For example, the set of configuration parameters may include information regarding a size of the file, which the optimization engine may use to determine the number of packets to be transmitted. The set of configuration parameters may also include information regarding a type of communication protocol or standard used for transmission (e.g., Ethernet, TCP/IP, etc.), which may provide the optimization engine with information regarding a maximum allowable transmission size (e.g., a maximum size for a single input packet) that may be transmitted over the network 110. The type of communication protocol or standard may also provide the optimization engine with information regarding the protocol overhead that may be used to transmit each of the input packets generated during transmission of the file. In some aspects, the optimization engine may also receive information regarding batch statistic, which may be used to optimize a batch rate used for the transmission.

During the optimization process, the optimization engine may evaluate different batch sizes and their associated coding overhead, as well as different numbers of packets for the transmission. During the evaluation the optimization engine may seek to identify a batch size and number of packets that satisfies and optimization criterion. For example, the optimization criterion may be configured such that the optimization is based on transmission overhead, which accounts for coding overhead, file-padding overhead, batch-padding overhead, protocol overhead, and the like. When a set of transmission parameters is identified as providing the optimum transmission overhead, the set of transmission parameters may be provided to a BNC encoder of the node 112 as a set of optimized parameters. Once received, the BNC encoder of the node 112 may then generate the set of input packets based on the number of packets determined by the optimization engine and the set of input packets may be encoded according to the batch rate determined by the optimization engine. In some aspects, the optimization engine may also account for side information and when accounted for, the set of packets generated and encoded for transmission may be optimized in a manner that accommodates inclusion of side information.

Once generated, the node 112 may transmit the file 102 to the computing device 140 as batches of encoded input packets via other nodes of the network 110. For example, the batches of packets may be received by the node 114. The node 114 may perform recoding for each of the batches of input packets as they are received prior to transmitting the (recoded) batches of input packets to a next (intermediate) node of the network 110 until the batches of input packets are finally received by the computing device 140. Since the batches of packets were encoded using a BNC encoder, each intermediate node may only need to perform recoding on the input packets of each received batch, rather than reconstructing the entire file and then performing the entire encoding process over again, which reduces the computational cost for transmitting data through the network 110 and enables the nodes 112-122 to be deployed with fewer computational resources (e.g., since recoding is only performed on a batch-by-batch basis, the nodes may utilize smaller data buffers).

The batches of input packets may propagate from node to node within the network 110 until they eventually reach the destination for the file, which in this example is the computing device 140. The computing device 140 may receive the (recoded) batches of packets and store them in a buffer (e.g., the memory 144 or a memory of the one or more communication interfaces 146) until a sufficient number of input packets have been received to enable the computing device 140 to reconstruct the file. Once the appropriate number of input packets have been received, the computing device 140 may reconstruct the file to obtain the information transmitted by the node 112 (e.g., the source node). As will be described in more detail below with reference to FIGS. 4A-4C, transmitting files in accordance with the concepts described above, which leverage optimization techniques to reduce transmission overhead, may enable the network 110 to achieve high throughput while mitigating factors that may otherwise degrade performance of the network 110, such as file-padding overhead, batch-padding overhead, or other factors.

As can be appreciated from the foregoing, the encoding/recoding and optimization processes utilized by the nodes of the network 110 represent a significant improvement for multi-hop networks. Moreover, encoding/recoding and optimization processes utilized by the nodes of the network 110 enable the nodes 112-122 to be deployed with fewer computational resources (e.g., lower memory and CPU resources) than may be required to achieve the same throughput using other transmission techniques, including standard BNC and RLNC transmission techniques. Such capabilities may enable many of the use cases for which multi-hop networks are currently being considered to be realized. For example, smart city applications may require hundreds or even thousands of sensors to be deployed in noisy environments and/or environments where wireless connectivity may be needed. Such constraints may limit the ability to utilize wired networks that may be more resilient to the noisy environments likely to be encountered, resulting in the need for communication between the sensors and devices via wireless communication links. Moreover, such smart city applications are likely to involve a large amount of traffic related to transmission of small file sizes, which are prone to error and likely to result in performance degradation using traditional communication techniques, such as BNC and RLNC. However, the optimizations disclosed herein mitigate these drawbacks. To illustrate, the encoding techniques disclosed herein dynamically configure transmissions based on file size, which reduces the impact that file-padding overhead and batch-padding overhead have on the network and improves throughput. Additionally, by leveraging BNC-based encoding schemes, the network may be more resilient to noisy environments. Thus, embodiments of the present disclosure are well-suited to support smart city applications.

In addition to smart city applications, the transmission techniques disclosed herein may also be readily utilized in other use cases and applications. For example, with the continued interest in IoT, it is becoming increasingly more common for deployments to utilize smaller, lower power or battery operated devices instead of more powerful and larger devices in many situations. The transmission techniques disclosed herein are particularly well suited for use in such deployments due to the reduced computational complexity and memory (e.g., buffer) requirements afforded by the present invention. It is noted that the exemplary use cases and deployment options described above have been provided for purposes of illustration, rather than by way of limitation and that the transmission techniques disclosed herein may be readily utilized in any use case or scenario in which increased throughput and lower computational and power requirements may be desired.

Additionally, it is noted that while FIG. 1 shows the network 110 as including six nodes (e.g., the nodes 112-122), embodiments of the present disclosure may be readily utilized in network deployments having more than six nodes or less than six nodes according to the particular use case involved. Moreover, it should be understood that each of the nodes 112-122 may include processors, memory, communication interfaces, sensors, or other types of components and devices suitable for performing the operations described herein. Furthermore, it is to be understood that while FIG. 1 shows the network 110 as single logical grouping of nodes, the concepts described herein may be readily applied to more complex network environments. For example, a multi-hop network according to the concepts disclosed herein may be deployed in an environment where other types of wired or wireless communication networks may not be suitable (e.g., due to noise, cost, etc.) and one or more devices of the multi-hop network may be communicatively coupled to other types of networks or act as gateways to other types of networks. In such deployments, the gateway between a multi-hop network operating in accordance with the present disclosure and other types of networks may reconstruct the files (e.g., once a sufficient number of input packets (or batches of input packets) have been received) and retransmit the files over other types of networks using different protocols and techniques or vice versa.

Figure 2:
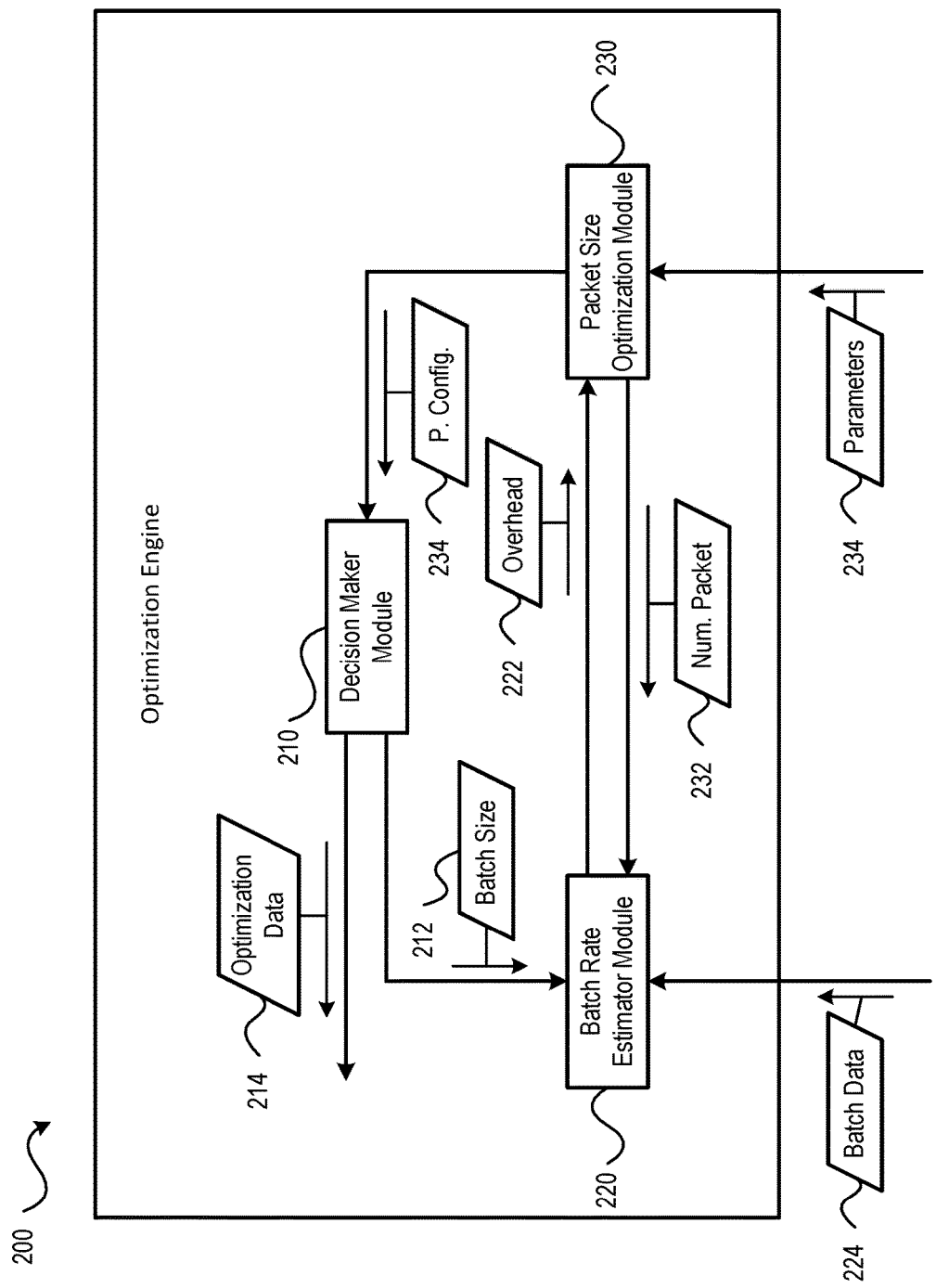
FIG. 2 shows a block diagram of an architecture for configuring transmissions in accordance with aspects of the present disclosure.

To further illustrate the optimization of transmissions in accordance with the present disclosure and with reference to FIG. 2, a block diagram of an optimization engine for optimizing transmissions in accordance with the present disclosure is shown as an optimization engine 200. In an aspect, the optimization engine 200 may be incorporated into nodes of a network, such as the nodes 112-122 of the network 110 of FIG. 1. In an aspect, the functionality described with respect to the optimization engine 200 may be stored as software instructions in a memory (e.g., a memory of a network node) and the instructions, when executed by one or more processors (e.g., a processor of a network node), cause the one or more processors to perform operations to optimize transmissions in accordance with the concepts disclosed herein and the functionality of the optimization engine 200 of FIG. 2.

As shown in FIG. 2, the optimization engine 200 includes a decision maker module 210, a batch rate estimator module 220, and a packet size optimization module 230. As described above with reference to FIG. 1, the optimization engine 200 may be configured to receive a set of optimization parameters including information associated with a file to be transmitted. To begin the optimization process, the decision maker module 210 may select one or more candidate batch sizes 212 and provide the candidate batch sizes 212 to the batch rate estimator module 220.

In an aspect, the decision maker module 210 may start the optimization process using a pre-determined batch size. The pre-determined batch size may be set based on information related to historic traffic on the network (e.g., the network 110). For example, the historic network traffic may indicate that a particular file size is most common on the network and the pre-determined batch size may be configured according to a batch size that is has been previously determined to provide an optimized transmission of files having the particular file size. In this manner, the initial batch size selected for evaluation by the optimization engine 200 may be an appropriate batch size for the most common size of files transmitted in the network. In an additional or alternative aspect, a set of pre-determined batch sizes may be configured based on a set of common file sizes transmitted over the network, such as the top "X" most common file sizes, where X>1. In such an arrangement, the optimization engine 200 may be configured to evaluate the set of pre-determined batch sizes first when a new file is to be transmitted over the network. Where the set of batch sizes to be considered is limited to a particular number or set of candidate batch sizes, such information may be passed to the optimization engine as an input, such as by a network administrator or configured at the time the node corresponding to the optimization engine 200 is deployed. Moreover, the set(s) of candidate batch sizes that may be considered may be changed if desired. In some aspects, the optimization process may be performed iteratively and each iteration may consider a different candidate batch size (or set of batch sizes) determined by the decision maker module 210. In additional or alternative aspects, a set of candidate batch sizes may be considered during each iteration. In some aspects, the decision maker module 210 may be configured to use brute force or semi-brute force techniques to evaluate all batch sizes or a set of candidate batch sizes, respectively, as described in more detail below. Further details regarding the brute force and semi-brute force techniques are described in more detail below with reference to FIG. 3.

The batch rate estimator 220 receives the candidate batch size(s) 212 from the decision maker 210 and determines overhead information 222 for the input packets. As a non-limiting example, the overhead information 222 may include coding overhead for generating input packets according to the candidate batch size(s). The batch rate estimator 220 may provide the overhead information 222 and batch size(s) to the packet size optimization module 230. In some aspects, side information may also be generated by the batch rate estimator module 220, which may be provided with the overhead information 222. When utilized, the side information may also be provided to the packet size optimization module 230 with the overhead information 222 (and the batch size). The side information may also include batch statistics, which may be passed to or generated by the batch rate estimator module 220. Exemplary details regarding batch statistics are described in more detail below.

The packet size optimization module 230 may utilize the overhead information 222, the batch size, and the set of optimization parameters (e.g., file size, protocol overhead, maximum transmission size, and the like) to determine a number of packets 232 for transmitting the file according to the batch size. Where multiple batch sizes are being considered, the packet size optimization module 230 may determine a number of packets to be generated for each candidate batch size.

In some aspects, the batch rate estimator module 220 and the packet size optimizer module 230 may exchange the above-described information several times during the optimization process to refine optimization of the parameters to be used for transmission of the file. For example, the batch rate estimator module 220 estimates the optimized batch rate for a given batch size, where a higher batch rate gives a higher throughput. It is noted that the required coding overhead for the optimized batch rate may be used at the destination node (e.g., computing device 140 of FIG. 1) to recover the file with a desired successful probability. As such, optimization of the transmission may account for channel or network conditions and adjust the coding rate selected for the transmission to accommodate different states within the network. For example, when the network operates in a noisy environment, the coding rate may be modified to increase the probability the destination node successfully recovers the file. Similarly, the coding rate may be adjusted when the network is experience high or low volumes of traffic to improve throughput (e.g., more efficiently use the bandwidth of the network) or to increase reliability (e.g., increase the probability the destination node successfully recovers the file). In an aspect, information regarding the current network state may be provided to the batch rate estimator module 220 (e.g., from another node of the network) or may be estimated by the node itself.

The packet size optimizer module 230 calculates the optimized number of packets based on a given candidate batch size and the overhead information 222 received from the batch rate estimator 220, thereby enabling the transmission to be optimized with respect to the transmission overhead. The transmission overhead represents the number of symbols sent by the source node minus the file size, which may serve as a measure of the overall overhead (e.g., the coding overhead, protocol overhead, file-padding overhead, and batch-padding overhead). As mentioned above, the packet size optimizer module 230 may pass a number of packets 232 to the batch rate estimator 220. The purpose of this data exchange between the batch rate estimator module 220 and the packet size optimization module 230 (e.g., the exchange of overhead data 222/batch size and the number of packets 232) is to enable the batch rate estimator 220 to re-estimate the coding overhead based on the optimized number of packets determined by the packet size optimization module 230 and indicated by the number of packets 232.

The exchange of information between the batch rate estimator 220 and the packet size optimizer module 230 may be performed one or more times. When performed multiple times (e.g., in an iterative manner), the number of iterations may be limited by an optimization criterion. For example, the number of iterations may be limited to a threshold number of iterations (e.g., 3 iterations, 5 iterations, 10 iterations, etc.), a threshold transmission overhead (e.g., estimated transmission overhead<a threshold transmission overhead), or another criterion. In some aspects, the number of iterations may be dictated by whether the brute force or semi-brute force techniques are used. Exemplary details regarding these techniques are described in more detail below with reference to FIG. 3.

In some aspects, the batch rate estimator 220 may optionally receive batch statistics data 224. As briefly described above, the batch statistics 224 are a type of side information, which may be generated by the batch rate estimator 230 (e.g., degree distribution in the BATS codes example above) or passed to the batch rate estimator module 230, as illustrated in FIG. 2. The batch statistics data 224 may include statistics associated with batches of input packets received by the destination node(s), which provides the batch rate estimator 220 with information indicative of the packet loss conditions at the intermediate network links and how well the applied network optimization techniques are performing within the network. The batch rate estimator 220 may use the batch statistics data 224 to estimate the batch rate and thus, the overhead information 222. To illustrate, the batch rate estimator 220 may utilize the batch statistics data 224 to modify the batch rate and improve performance of the network 110, such as by selecting a batch rate predicted to increase the probability of successful recovery at the expense of increased transmission overhead (e.g., when packet loss is high) or select a batch rate predicted to reduce transmission overhead at the risk of potential decreased probability of successful recovery (e.g., when packet loss is low). For example, the batch statistics data 224 may include information regarding a batch rank distribution, which can be used to optimize the batch rate by utilizing different formation approaches to generate batches of the input packets. As another example, a class of BNC, called the BATS codes, may be used to formulate a degree optimization problem to optimize the batch rate based on batch statistics. The optimization problem outputs an optimized degree distribution, where the number of input packets associated with each batch is sampled via the optimized degree distribution. The batch statistics 224 may be received via a feedback mechanism, premeasurement, analytical calculation, or another technique (e.g., a centralized node may collect the batch statistics and distribute them to the nodes of the network, etc.).

It is noted that while the batch statistics 224 may be utilized by the batch rate estimator module 220, the use of the batch statistics is optional and may be omitted in some implementations. For example, the batch rate estimator module 220 may determine the coding overhead independent of the batch statistics. In implementations where the batch rate estimator module 220 does not utilize batch statistics, the packet size optimizer module 230 may not pass the number of packets 232 to the batch rate estimator module 220 and the coding overhead may simply be configured based on the batch size data 212. In such implementations, the optimization process may be simplified and the computational complexity may be reduced significantly, which may be particularly useful where the optimization engine 200 is implemented on nodes having limited computational resources. Regardless of whether multiple iterations are performed or not, the packet size optimizer module 230 may only include the parameters corresponding to the number of packets having the smallest transmission overhead when providing the set of optimized parameters 234 to the decision maker module 210. Thus, the set of optimized parameters 234 may include information regarding the number of packets, the transmission overhead, the coding overhead, and optionally the side information, if any, according to the optimized configuration determined by the batch rate estimator module 220 and the packet size optimization module 230.

To illustrate the relationship between the batch rate and the coding overhead, let the batch rate, which is a measure of the expected number of input packets which can be recovered for each batch, be represented by $\theta$, and let K represent the total number of input packets that need to be received at the destination node (e.g., the computing device 140 of FIG. 1 or another device) in order to recover the file. The batch rate ($\theta$) may be a non-negative real number no larger than the batch size, where the batch size is the number of input packets per batch generated by the BNC encoder. Since the destination node needs only recover K input packets to recover the file, the source node should generate and transmit no fewer than $\lceil K/\theta \rceil$ batches. Letting the coding overhead be $1+\epsilon_K$, the source node is expected to generate $(1+\epsilon_K)K$ packets, thus $$\left\lceil \frac{(1+\epsilon_K)K}{M} \right\rceil$$

batches, where M is the batch size. Accordingly, the smallest coding overhead can be expressed as $$\frac{M}{\theta} - 1.$$

To ensure a higher probability of successful recovery, the coding overhead may be selected such that the coding overhead is larger than $$\frac{M}{\theta} - 1,$$

which reflects a tradeoff between the throughput and the probability of successful recovery by the destination node.

Now consider a dynamic coding overhead where, for each batch size given by the decision maker module 210 of FIG.

2, the batch rate estimator 220 does not have the information of the number of packets at the beginning. In a general sense, an asymptotic batch rate optimization assumes a very large number of input packets, so the number of packets does not contribute to the optimization. This approach may be used as an initial attempt to obtain the coding overhead for the input packet size optimization module 230.

However, after the packet size optimization module 230 has given an optimized number of input packets (e.g., the number of packets 232) to the batch rate estimator module 220, a finite-length batch rate optimization (or approximation) can be performed, which uses the number of packets as an input to determine a new coding overhead that may enhance the performance of BNC as compared to the coding overhead determined in the absence of any information about the number of input packets. In some aspects, one or more additional iterations between the batch rate estimator module 220 and the packet size optimization module 230 may then be performed until a stop criterion is reached, such as a threshold number of iterations (e.g., 3 iterations). In additional or alternative aspects a single iteration may be performed, which may increase the speed at which files are transmitted while providing improved performance as compared to using a static configuration, as in traditional BNC, or not taking into account the number of input packets when determining the coding overhead. Furthermore, the finite-length batch rate optimization without taking into account the number of input packets may also be utilized. In such instances, the coding overhead does not change after the asymptotic batch rate optimization, and therefore, the packet size optimization module 230 does not need to pass the number of packets 232 back to the batch rate estimator module 220.

In the description above the focus was on the number of input packets and how the number of input packets may impact or affect the coding overhead. Now, the relationship between the packet size and the number of input packets will be considered. Let F be the file size and K be the number of packets. Using these parameters, the packet size T can be calculated as $\lceil F/K \rceil$. Thus, given the number of packets and the file size, the packet size can be obtained directly. Therefore, it is sufficient to output the number of packets in the data flow since the file size is known.

Now let P be the protocol overhead for a given candidate batch size. The transmission overhead, which is the number of symbols to be generated and transmitted, may be expressed as $$\left\lceil \frac{(1+\epsilon_K)K}{M} \right\rceil M\left(\left\lceil \frac{F}{K} \right\rceil + P\right),$$

minus the file size F. As the last term (i.e., the file size) does not affect the comparison between the transmission overheads of different number of packets, this term is omitted in the description that follows.

Next, let $T_{max}$ be the maximum allowed transmission size minus the protocol overhead (i.e., the maximum allowed input packet size). This limits the minimum number of packets, which is $$K \geq \left\lceil \frac{F}{T_{max}} \right\rceil.$$

Now, defining $$f_c(K) = \left\lceil \frac{cK}{M} \right\rceil M\left(\left\lceil \frac{F}{K} \right\rceil + P\right),$$

the packet size optimizer aims to find a K which optimizes:

$$\min_K f_{1+\epsilon_K}(K) \quad \text{s.t.} \quad K \geq \left\lceil \frac{F}{T_{max}} \right\rceil$$

where K is an integer between 1 and F inclusive.

Due to the constraints of the optimization problem, the smallest feasible K, denoted by $K_{min}$, is $\lceil F/T_{max} \rceil$. On the other hand, the largest feasible K, denoted by $K_{max}$, can be obtained via min $$\left\{ F, \left\lceil \frac{f_{1+\epsilon_K}(K_{min}) - (1+\epsilon)F}{(1+\epsilon)P} \right\rceil - 1 \right\}.$$

Thus, $K_{min}$ and $K_{max}$ define a bounded search range from which the total number of packets for the transmission may be derived.

Besides trying all possible K in the search range by brute-force (i.e., the brute force technique described above with reference to FIG. 2), the disclosed optimization engine 200 and its associated optimization techniques may also use heuristics to define the search range or search space to be used for optimizing a transmission for a particular file. Exemplary heuristics are described in more detail below.

Figure 3:
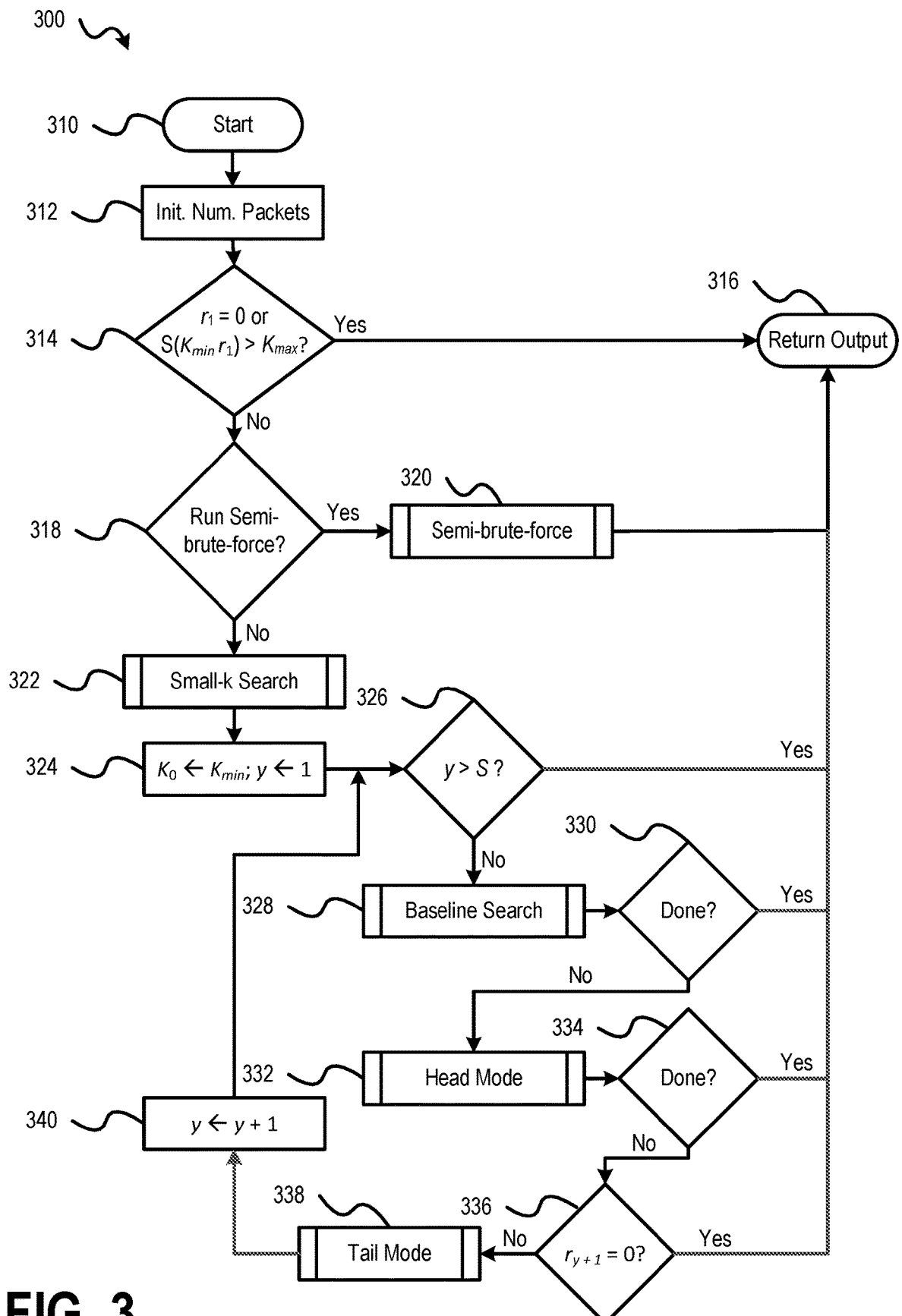
FIG. 3 shows a flow diagram of an exemplary method for configuring transmissions in accordance with aspects of the present disclosure.

Referring to FIG. 3, a block diagram of an exemplary process for optimizing transmissions in accordance with aspects of the present disclosure is shown as a process 300. It is noted that the process 300 shown in the flow diagram of FIG. 3 is provided to reinforce the concepts described above with reference to the optimization module and presents many of the concepts described above with reference to FIG. 2. Thus, it should be understood that concepts for optimizing transmissions described with reference to FIG. 3 could be readily utilized with the optimization engine 200 of FIG. 2 and the nodes 112-122 of FIG. 1.

The following notations may be used for shortlisting the K in the search range for the heuristics described below and shown in FIG. 3.

$$\text{Define } r_1 = \frac{(1+\epsilon_K) \bmod M}{M}.$$

For any positive integer y, define $$r_{y+1} = \frac{1}{r_y} - \left\lfloor \frac{1}{r_y} \right\rfloor \text{ if } r_y \neq 0.$$

For any positive integer y, define $\mathbb{S}_y(K) = S_1 \circ S_2 \circ \ldots \circ S_y(K)$, where $$S_y(K) = \begin{cases} \left\lfloor \frac{K}{r_y} \right\rfloor, & y \text{ is odd,} \\ \left\lceil \frac{K}{r_y} \right\rceil, & y \text{ is even.} \end{cases}$$

Starting at block 310, the process 300 begins at block 312, where $K_{out}$ may be initialized to $K_{min}$. This initialization step ensures that the number of packets to be generated is set to the minimum number of packets. However, the number of packets K to be generated may be changed by the process 300. At decision block 314, the process 300 may evaluate whether:

$$r_1 = 0 \text{ or}$$

$$S_1([K_{min}r_1]) > $$

where $r_1=0$ evaluates whether there is no need to perform the other heuristics and $S_1(K_{min}r_1) > K_{max}$ evaluates whether the shortlist of K is empty (i.e., the smallest candidate of K exceeds the maximum allowed number of packets $K_{max}$). In the process 300, S may be a predefined positive integer threshold (e.g., S>0) for limiting the number of iterations for three of the heuristics, referred to as the "baseline search", "head mode", and "tail mode, each of which is described in more detail below with reference to blocks 328, 332, 338.

If the evaluation at decision block 314 is satisfied (e.g., decision block 314=Yes), the process 300 may proceed to block 316, where the packet size optimization module 230 of FIG. 2 may output $K_{out}$. If the evaluation at decision block 314 is not satisfied (e.g., decision block 314=No), the process 300 may proceed to block 318, where a determination is made as to whether a semi-brute force technique is to be used. It is noted that the "semi-brute-force" heuristic is optional and may be omitted in some implementations. Where semi-brute force heuristic is utilized, the packet size optimization module 230 may determine that this heuristic is satisfied when an approximated number of times of evaluating f in the remaining heuristics (described below) exceeds a threshold. Compared with a brute-force search in the whole search range, the semi-brute-force heuristic only tries a selection of possible values for K. When the semi-brute force heuristic is satisfied (i.e., decision block 318=Yes), the packet size optimizer 230 performs, at block 320, semi-brute force analysis and the results are provided to block 316, where $K_{out}$ is output without running the remaining heuristics. The semi-brute force analysis performed at block 320 may be expressed as:

```
K₁ ← ⌈K_min r₁⌉ + 1;
while S₁(K₁) ≤ K_max do
  | K_out ← min(arg min_{K∈{S₁(K₁),K_out}} f_{1+ε_K}(K));
  | K₁ ← K₁ + 1;
```

If the semi-brute force technique is not to be utilized (i.e., decision block 318=No), the process 300 proceeds to block 322, where a next heuristic may be considered by the process 300. The next heuristic may be referred to as the "small-K search". This heuristic, which is also optional, focuses on small values of K that may be missed by the remaining heuristics. It is noted that the small-K search heuristic may be omitted if P=0 (i.e., if there is no protocol overhead). The small-K search may be expressed as:

```
K₀ ← ⌊(√(F/P) + 1)/⌈1/r₁⌉⌉⌈1/r₁⌉ - 1;
if K_min ≤ K₀ ≤ K_max then
  | K_out ← min(arg min_{K∈{K₀,K_out}} f_{1+ε_K}(K));
K'₀ ← ⌈(√(F/P) + 1)/⌈1/r₁⌉⌉⌈1/r₁⌉ - 1;
if K'₀ ≠ K₀ ∧ K_min ≤ K'₀ ≤ K_max then
  | K_out ← min(arg min_{K∈{K'₀,K_out}} f_{1+ε_K}(K));
```

At block 324, parameters for iterative optimization may be configured. In particular, $K_0$ may be initialized to $K_{min}$ and a count of the number of iterations y may be initialized to 1. After the initialization at block 324, the process 300 may proceed to decision block 326, where a determination may be made as to whether y>S, where S represents a predefined positive integer threshold (e.g., S>0) for limiting the number of iterations for evaluating three of the heuristics (e.g., the "baseline search" heuristic, the "head mode" heuristic, and the "tail mode" heuristic). If decision block 326 determines that the number of iterations represented by y satisfies the threshold S (e.g., y>S), process 300 proceeds to block 316 where $K_{out}$ is output. However, if decision block 326 determines that the number of iterations represented by y does not satisfy the threshold S (e.g., y≤S), process 300 proceeds to block 328 where the baseline search may be performed. The "baseline search" heuristic, which runs during each iteration, may involve the following steps:

```
done ← no;
K_y ← ⌈K_{y-1} r_y⌉;
if S_y(K_y) > K_{y-1} then
  | if S_y(K_y) > K_max then
  |   | done ← yes;
  | else
  |   | K_out ← min(arg min_{K∈{S_y(K_y),K_out}} f_{1+ε_K}(K));
```

After the baseline search operations are complete the process 300 may proceed to decision block 330, which may determine whether to continue the process 300. For example, if the remaining shortlist of K is empty (i.e., the smallest candidate of K exceeds the maximum allowed number of packets $K_{max}$), decision block 330 may determine that process 300 is complete. If decision block 330 determines that process 300 is complete, the process may proceed to block 316 where $K_{out}$ is output. If, however, block 330 determines that process 300 is not complete, the process 300 may proceed to block 332 where a "head mode" heuristic may be evaluated. It is noted that the "head mode" heuristic may also be optional. The operations of the "head mode" heuristic may be expressed as:

```
done ← no;
K_y ← K_y + 1;
if S_y(K_y) > K_max then
  | done ← yes;
else
  | K_out ← min(arg min_{K∈{S_y(K_y),K_out}} f_{1+ε_K}(K));
```

After the "head mode" heuristic is complete, process 300 proceeds to decision block 334, which may determine whether to continue the process 300. For example, if the remaining shortlist of K is empty (i.e., the smallest candidate of K exceeds the maximum allowed number of packets $K_{max}$), decision block 334 may determine that process 300 is complete. If decision block 334 determines that process 300 is complete, the process may proceed to block 316 where $K_{out}$ is output. If, however, block 334 determines that process 300 is not complete, the process 300 may proceed to block 336 where $r_{y+1}=0$ may be evaluated. If block 336 evaluates to yes, the process may proceed to block 316 where $K_{out}$ is output. Otherwise, the process 300 proceeds to block 338 a "tail mode" heuristic is run. Like the "head mode" heuristic, the "tail mode" heuristic may be optional. The "tail mode" heuristic may perform operations that may be expressed as:

$$K'_y \leftarrow S_{y+1}(\lceil K_y r_{y+1} \rceil + \delta_{K_y, S_{y+1}(\lceil K_y r_{y+1} \rceil)}) - 1;$$
$$\text{if } \neg(K'_y) = K_y \lor S_y(K'_y) > K_{max}) \text{ then}$$
$$\quad | \quad K_{out} \leftarrow \min(\arg\min_{K \in \{S_y(K'_y), K_{out}\}} f_{1+\epsilon_K}(K));$$

After the operations of the "tail mode" heuristic are completed, process 300 proceeds to block 340, where y is incremented, and then returns to block 326 to begin a new iteration. After all the iterations of y are completed, the packet size optimization module 230 of FIG. 2 may returns the final value for $K_{out}$. If there is another round of iteration to update the coding overhead, then $K_{out}$ may be passed to the batch rate estimator module 220 and updated overhead information 222 based on the value of $K_{out}$ passed to the batch rate estimator module 220 may be received. Otherwise, $K_{out}$, together with the corresponding transmission overhead, and the side information received from the batch rate estimator module 220 are passed to the decision marker module 210 of FIG. 2.

As described above with reference to FIG. 2, the decision maker module invokes the functionality of the batch rate estimator module 220 for one or more batch sizes and receives, for each batch size, a set of optimized results from the packet size optimization module 230. After trying all the batch sizes, the decision maker module 210 may choose the set of optimized results (e.g., the set of optimized parameters 234) which has the smallest transmission overhead, and the batch size corresponding to this set of results together with the optimized number of packets, coding overhead, and side information if there is any, are used to configure the transmission of a file.

As described above, in some aspects the decision maker 210 may utilize a "brute-force" approach in configuring parameters for transmitting a file. Unlike the "semi-brute force" heuristic described above, which is configured to evaluate a selection of possible values for K within the search range, the brute force approach the packet size optimization module 230 may attempt to evaluate all possible K within the search range. In the brute-force technique the decision maker 210 may select a set of parameters (e.g., batch size, number of input packets, etc.) providing the lowest transmission overhead for a particular file to be transmitted. It is noted that the use of the brute-force technique or the heuristics-based techniques described above may be configurable. For example, an administrator of the network may configure the nodes of the network to utilize brute-force or heuristic-based techniques to optimize transmission of a file. For instances where the "brute-force" approach is desired, ASICs or other hardware-based implementations may be preferred so that evaluating different values of K can be performed in parallel. One advantage of the brute force approach is that it can guarantee to find an optimal K, while the heuristics-based approaches of FIG. 3 (including semi-brute force approach) may shortlist away the true optimal K. However, experimental results have shown that the heuristics-based approaches described above often result in the optimal K in the absence of the brute-force approach and in instances where the optimal K was not obtained, the optimality gap in transmission overhead between the optimal K and the obtained K was usually negligible.

It is noted that while the description above has been primarily described with respect to each node of a network operating in accordance with the present disclosure having an optimization engine, in some implementations the optimization engine may be provided by one or more nodes the network and other nodes that do not have an optimization engine may submit requests to the optimizer node(s). The requests may include information for optimizing parameters in accordance with the concepts described above and upon identifying the optimized parameters for transmitting a particular file, the optimizer node may pass the optimized parameters to the requesting node of the network where the parameters may then be used to configure transmission of a file through the network to a destination node, such as the computing device 140 of FIG. 1.

Figure 4A:
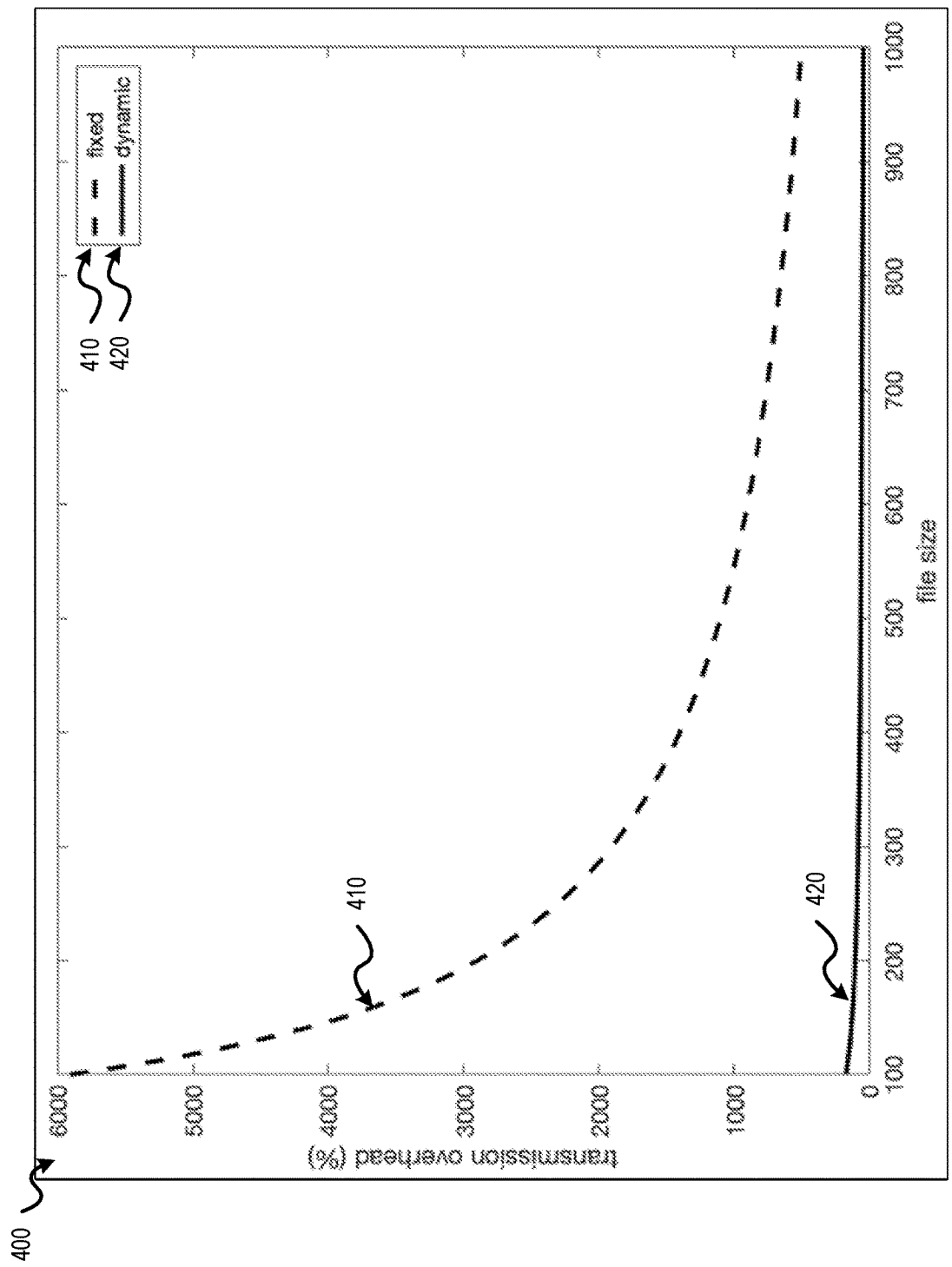
FIGS. 4A-4C show diagrams illustrating performance of transmissions configured in accordance with aspects of the present disclosure.
Figure 4B:
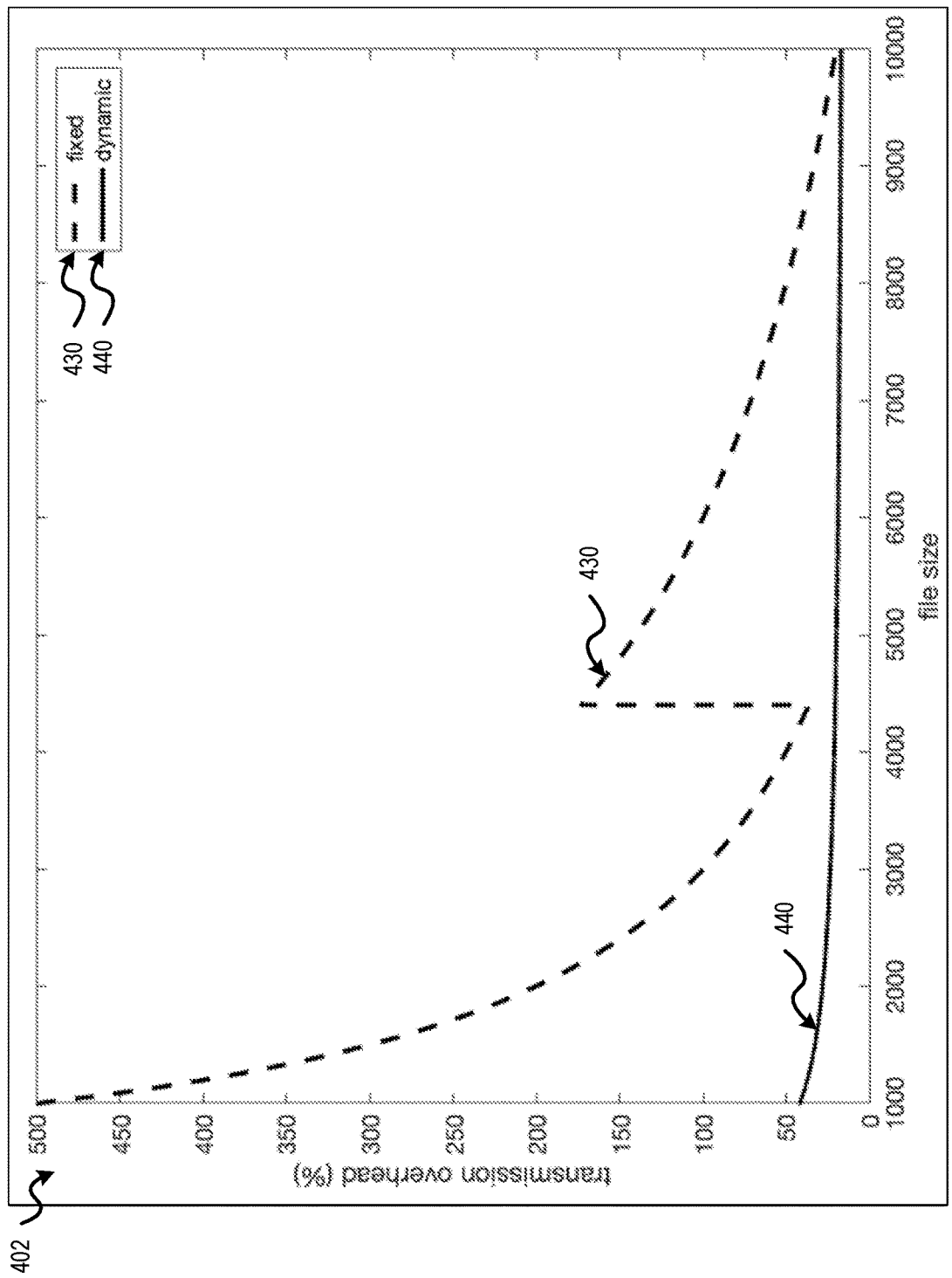
Figure 4C:
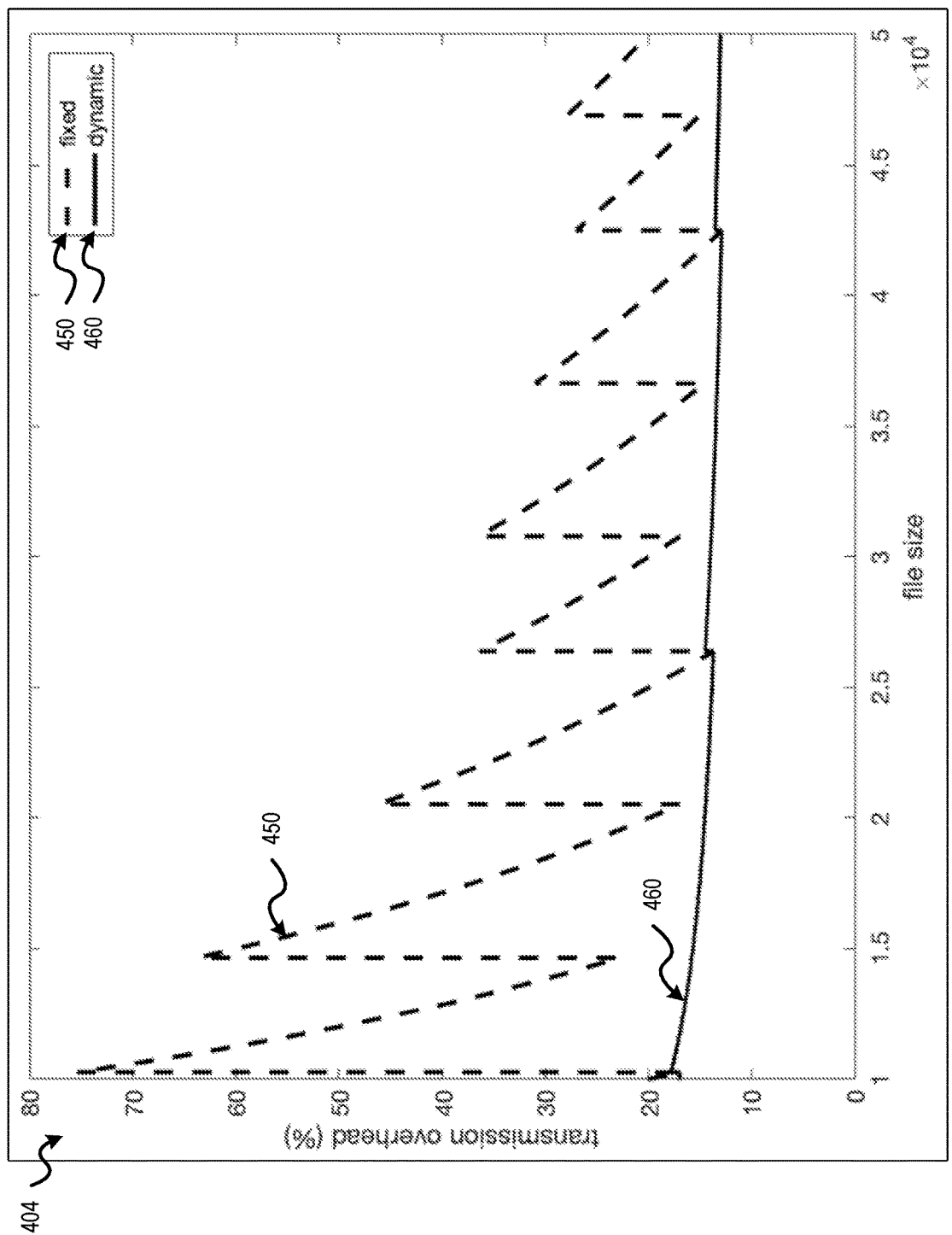

Referring to FIGS. 4A-4C show diagrams illustrating performance of transmissions configured in accordance with aspects of the present disclosure. In particular, FIGS. 4A-4C show diagrams comparing transmission overhead of transmissions sent using a fixed scheme to transmission overhead of transmissions sent using a dynamic scheme in accordance with aspects of the present disclosure.

Referring to FIGS. 4A-4C, diagrams demonstrating performance improvements provided via transmission of data in accordance with aspects of the present disclosure are shown. It is noted that in FIGS. 4A-4C, the performance is expressed in terms of transmission overhead (%) (e.g., y-axis) as a function of file size (e.g., x-axis) and the improvements can be seen in terms of reduced transmission overhead (%) for a given file size. The transmissions used to produce the diagrams shown in FIGS. 4A-4C included the following configuration parameters:

field size=256 (1 byte per symbol);
batch size (M)=4;
required coding overhead $1+\epsilon_K=1.1$;
max allowed input packet size $(T_{max})$=1466 bytes
protocol overhead (P)=34 bytes.

For the protocol overhead (P), 20 bytes were used for the IPv4 header, 8 bytes were used for the UDP header, 2 bytes for the batch ID, and a 4 bytes coefficient vector (e.g., 20+8+2+4=34). From the above, it can be seen that the configuration parameters yielded a transmission packet size of 1,500 bytes (e.g., $T_{max}$+P=1,466+34=1500 bytes), which is the commonly used maximum transmission unit (MTU) for Ethernet.

In the example transmissions shown in the diagrams of FIGS. 4A-4C a fixed scheme according to the prior art and a dynamic scheme according to the present disclosure were utilized to transmit files of different sizes. The fixed scheme utilized a fixed packet size (T), which was set to 1,466 bytes per the parameters above (e.g., $T_{max}$), while the dynamic scheme utilized a dynamic packet size (T'), which was capped according to the max packet size $(T_{max})$ (i.e., $T' \leq T_{max}$). To generate the plots shown in the diagrams of FIGS. 4A-4C files of varying file sizes (F) were transmitted using the fixed scheme and the dynamic scheme, where the plots represent the transmission overhead (%) as a function of file size for the fixed and dynamic schemes. For each transmission, the number of input packets (K) is given by:

$$K = \left\lceil \frac{F}{T} \right\rceil \text{ or } K = \left\lceil \frac{F}{T'} \right\rceil$$

and the transmission overhead (%) for the transmissions may be calculated according to:

$$\frac{f_{1+\epsilon_K}(K) - F}{F} \times 100\%.$$

In FIG. 4A, a diagram 400 shows a plot 410 corresponding to the observed transmission overhead (y-axis) for a series of transmissions involving different file sizes (x-axis) according to the fixed scheme and a plot 420 corresponding to the observed transmission overhead for a series of transmissions involving different file sizes according to the dynamic scheme. In FIG. 4B, a diagram 402 shows a plot 430 corresponding to the observed transmission overhead (y-axis) for a series of transmissions involving different file sizes (x-axis) according to the fixed scheme and a plot 440 corresponding to the observed transmission overhead for a series of transmissions involving different file sizes according to the dynamic scheme. In FIG. 4C, a diagram 404 shows a plot 450 corresponding to the observed transmission overhead (y-axis) for a series of transmissions involving different file sizes (x-axis) according to the fixed scheme and a plot 460 corresponding to the observed transmission overhead for a series of transmissions involving different file sizes according to the dynamic scheme.

As can be seen in FIGS. 4A-4C, the dynamic scheme (e.g., plots 420, 440, 460) exhibited significantly lower transmission overhead (%) as compared to the fixed scheme (e.g., plots 410, 430, 450) for transmissions involving smaller file sizes. Furthermore, it can be seen in FIGS. 4A-4C that the difference in transmission overhead (%) between the fixed scheme (e.g., plots 410, 430, 450) and the dynamic scheme becomes smaller as the file size grows larger. Thus, FIGS. 4A-4C demonstrate that utilizing dynamic input packet sizes in accordance with the present disclosure improves performance (i.e., reduces transmission overhead (%)) as compared to fixed packet size schemes, but that the measure of performance improvement provided by the dynamic scheme of the present disclosure decreases as file size increases. This is because the file-padding overhead and the batch-padding overhead, which are upper bounded by the size of the input packet, become relatively small compared with the file size as the file size grows larger.

Figure 5:
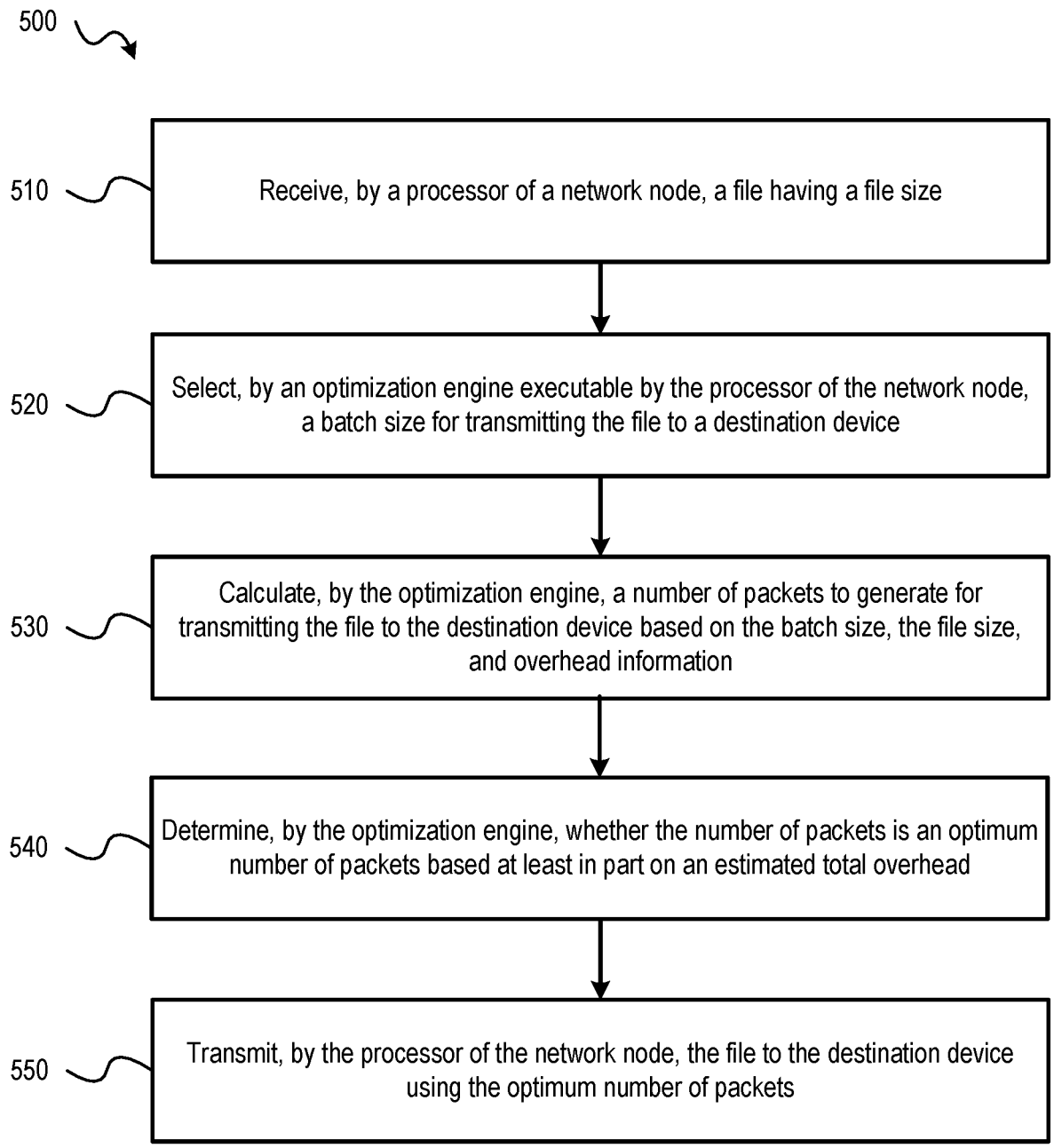
FIG. 5 is a flow diagram of an exemplary method for configuring transmissions in accordance with aspects of the present disclosure.

Referring to FIG. 5, a flow diagram of an exemplary method for configuring transmissions in accordance with aspects of the present disclosure is shown as a method 500. In an aspect, the method 500 may be stored at a memory of a network node as instructions that, when executed by one or more processors of the network node, cause the network node to perform operations for dynamic optimization of parameters for transmission of a file to a destination device via a network. In an aspect, the method 500 may be performed by a node of a network, such as one or more of the nodes 112-122 of FIG. 1. In additional or alternative aspects, the method 500 may be performed by a device coupled to a node of the network, such as the computing device 140 of FIG. 1 or another type of device that may transmit files over a network (e.g., a sensor, an IoT device, etc.).

At step 510, the method 500 includes receiving, by a processor of a network node, a file having a file size, and at step 520, selecting, by an optimization engine executable by the processor of the network node, a batch size for transmitting the file to a destination device. As described above, the batch size may be selected by a decision maker module of the optimization engine. In some aspects, more than one batch size may be selected. At step 530, the method 500 includes calculating, by the optimization engine, a number of packets to generate for transmitting the file to the destination device based on the batch size, the file size, and overhead information. In an aspect, the number of packets to generate for transmitting the file may be calculated as described above with reference to FIGS. 1-3. At step 540, the method 500 includes determining, by the optimization engine, whether the number of packets is an optimum number of packets based at least in part on an estimated total overhead. In an aspect, the determination of whether the number of packets is optimum may be determined as described above with reference to FIGS. 1-3, such as based on a total overhead for the transmission or some other criterion. At step 550, the method 500 includes transmitting, by the processor of the network node, the file to the destination device using the optimum number of packets. As described above, transmitting the file may include configuring a BNC encoder based on a batch rate determined by the optimization engine and generating batches of the input packets.

Figure 6:
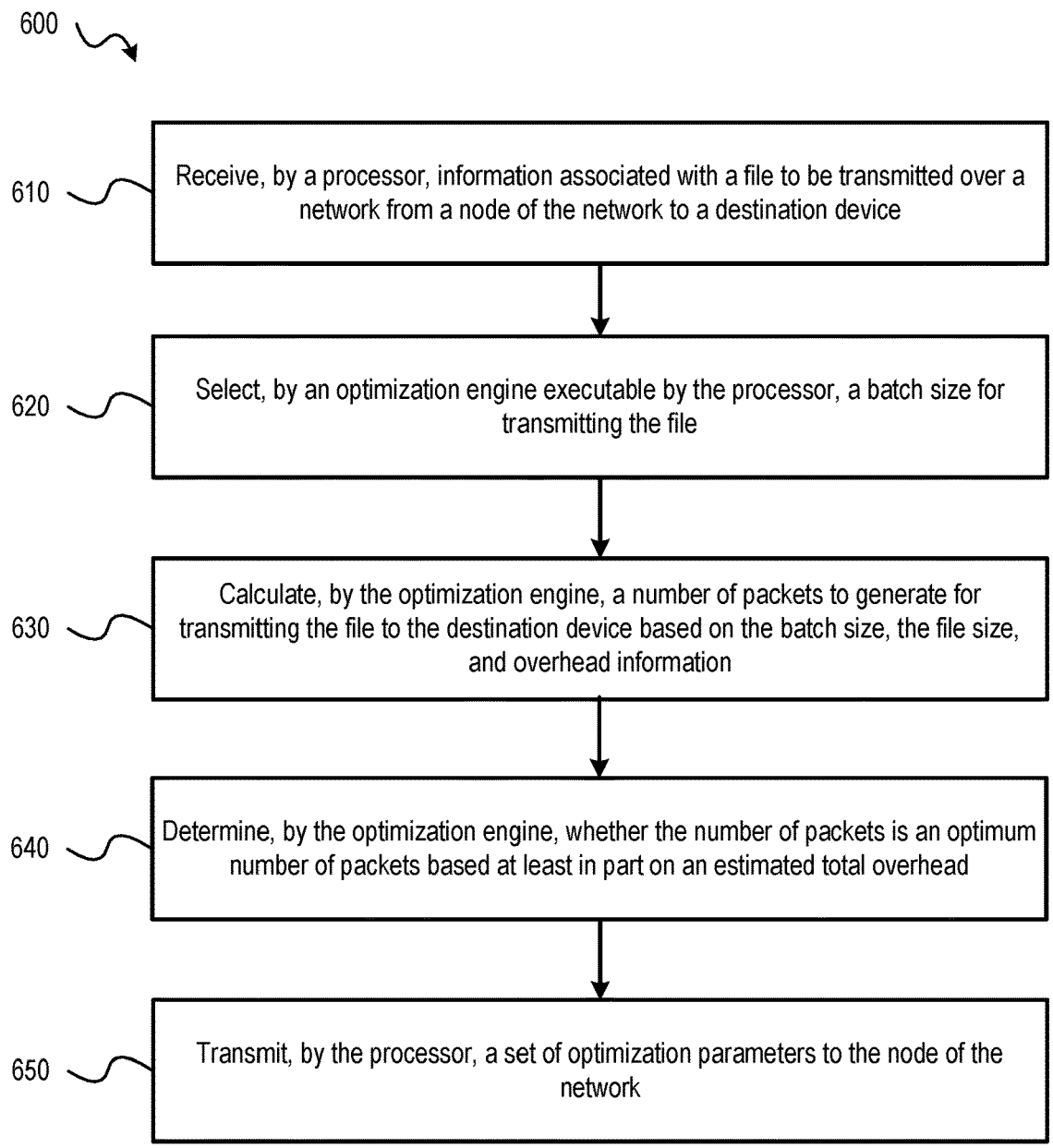
FIG. 6 is a flow diagram of another exemplary method for configuring transmissions in accordance with aspects of the present disclosure.

Referring to FIG. 6, a flow diagram of an exemplary method for configuring transmissions in accordance with aspects of the present disclosure is shown as a method 600. In an aspect, the method 600 may be stored at a memory of a network node as instructions that, when executed by one or more processors of the network node, cause the network node to perform operations for dynamic optimization of parameters for transmission of a file to a destination device via a network. In an aspect, the method 600 may be performed by a node of a network, such as one or more of the nodes 112-122 of FIG. 1. In additional or alternative aspects, the method 600 may be performed by a device coupled to a node of the network, such as the computing device 140 of FIG. 1 or another type of device that may transmit files over a network (e.g., a sensor, an IoT device, etc.).

At step 610, the method 600 includes receiving, by a processor, information associated with a file to be transmitted over a network from a node of the network to a destination device. As described above with reference to FIGS. 1-3 and 5, the information associated with the file may include a file size of the file and a protocol used by the network (e.g., to determine the maximum allowable size transmission unit). At step 620, the method 600 includes selecting, by an optimization engine executable by the processor, a batch size for transmitting the file, and at step 630, calculating, by the optimization engine, a number of packets to generate for transmitting the file to the destination device based on the batch size, the file size, and overhead information. As described above, the batch size may be selected by a decision maker module of the optimization engine. In some aspects, more than one batch size may be selected. In an aspect, the number of packets to generate for transmitting the file may be calculated as described above with reference to FIGS. 1-3.

At step 640, the method 600 includes determining, by the optimization engine, whether the number of packets is an optimum number of packets based at least in part on an estimated total overhead. In an aspect, the determination of whether the number of packets is optimum may be determined as described above with reference to FIGS. 1-3. At step 650, the method 600 includes transmitting, by the processor, a set of optimization parameters to the node of the network. As described above, the set of optimization parameters may include parameters that enable the node that provided the request (at step 610) to transmit the file to the destination device using the optimum number of packets.

As shown above, the method 500 and 600 enable dynamic optimizations to be applied to transmission of files over a network. The dynamic optimizations, which are determined in a manner that is specific to the file and infrastructure requirements (e.g., network protocols, etc.) to be used for the transmission of the file. As shown above with reference to FIGS. 4A-4C, the file-specific dynamic optimizations provided by the methods 500 and 600 of FIGS. 5 and 6 improve network throughput in a manner that is resilient to file size, thereby overcoming the drawbacks of existing techniques, such as RLNC and BNC, which can experience degradations of performance depending on file size. Moreover, aspects of the techniques disclosed herein with respect to FIGS. 1-3 enable network nodes to perform the methods 500 and 600 of FIGS. 5 and 6 using nodes having fewer computational resources (e.g., lower power requirements, lower memory requirements, lower processing or computational resources, etc.) while maintaining improved performance as compared to existing techniques. Such abilities may enable smart city applications, IoT applications, and other use cases of interest to be realized using multi-hop network techniques while retaining the performance improvements provided by embodiments of the present disclosure.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-6, include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method comprising:
   receiving, by a processor of a network node, a file having a file size;
   selecting, by an optimization engine executable by the processor of the network node, a batch size for transmitting the file to a destination device;
   calculating, by the optimization engine, a number of packets to generate for transmitting the file to the destination device based on the batch size, the file size, and overhead information;
   determining, by the optimization engine, whether the number of packets is an optimum number of packets based at least in part on an estimated total overhead; and
   transmitting, by the processor of the network node, the file to the destination device using the optimum number of packets.

2. The method of claim 1, further comprising:
   selecting at least one additional batch size;
   calculating at least one additional number of packets to generate for transmitting the file to the destination device based on the at least one additional batch size; and
   selecting the optimum number of packets as the number of packets or one of the at least one addition number of packets based on a comparison of the estimated total overhead corresponding to the number of packets and an additional estimate of the total overhead corresponding to the at least one additional number of packets.

3. The method of claim 1, wherein the network node comprises a batched network coding (BNC) encoder, the method further comprising:
generating the optimum number of packets based on the file; and
encoding, by the BNC encoder, the optimum number of packets according to a particular batch size corresponding to the optimum number of packets.

4. The method of claim 1, further comprising estimating the overhead information based on the batch size.

5. The method of claim 4, further comprising:
determining an initial number of packets for transmitting the file based on the batch size; and
updating the overhead information based on the initial number of packets for transmitting the file.

6. The method of claim 5, further comprising:
updating the total number of packets based on the overhead information.

7. The method of claim 1, wherein the overhead information comprises information regarding side information.

8. The method of claim 1, further comprising receiving batch statistics via the network node, wherein the overhead information is determined based at least in part on the batch statistics.

9. The method of claim 1, further comprising:
receiving a batch of input packets encoded using batched network coding (BNC) transmission from a second node of the network;
performing BNC recoding on the batch of input packets received from the second node to produce a recoded batch of input packets; and
transmitting the recoded batch of input packets to a device, wherein the device is another node of the network or a destination device.

10. A method comprising:
receiving, by a processor, information associated with a file to be transmitted over a network from a node of the network to a destination device, the information associated with the file comprising a file size of the file and a protocol used by the network;
selecting, by an optimization engine executable by the processor, a batch size for transmitting the file;
calculating, by the optimization engine, a number of packets to generate for transmitting the file to the destination device based on the batch size, the file size, and overhead information;
determining, by the optimization engine, whether the number of packets is an optimum number of packets based at least in part on an estimated total overhead; and
transmitting, by the processor, a set of optimization parameters to the node of the network, the set of optimization parameters comprising parameters for transmitting the file to the destination device using the number of packets in response to a determination that the number of packets is the optimum number of packets.

11. The method of claim 10, further comprising:
selecting at least one additional batch size;
calculating at least one additional number of packets to generate for transmitting the file to the destination device based on the at least one additional batch size; and
selecting the optimum number of packets as the number of packets or one of the at least one addition number of packets based on a comparison of the estimated total overhead corresponding to the number of packets and an additional estimate of the total overhead corresponding to the at least one additional number of packets.

12. The method of claim 10, further comprising:
estimating the overhead information based on the batch size;
determining an initial number of packets for transmitting based on the batch size; and
updating the overhead information based on the initial number of packets for transmitting the file.

13. The method of claim 12, further comprising updating the total number of packets based on the overhead information to produce an updated total number of packets, wherein the number of packets comprises the updated total number of packets.

14. The method of claim 10, wherein the overhead information comprises information regarding side information.

15. An apparatus comprising:
a memory;
a processor communicatively coupled to the memory;
an optimization engine executable by the processor and configured to:
receive information regarding a file size for a file to be transmitted to a destination device via a network;
select a batch size for transmitting the file to a destination device;
calculate a number of packets to generate for transmitting the file to the destination device based on the batch size, the file size, and overhead information;
determine whether the number of packets is an optimum number of packets based at least in part on an estimated total overhead; and
transmit the file to the destination device using the optimum number of packets.

16. The apparatus of claim 15, the optimization engine further configured to:
select at least one additional batch size;
calculate at least one additional number of packets to generate for transmitting the file to the destination device based on the at least one additional batch size; and
select the optimum number of packets as the number of packets or one of the at least one addition number of packets based on a comparison of the estimated total overhead corresponding to the number of packets and an additional estimate of the total overhead corresponding to the at least one additional number of packets.

17. The apparatus of claim 15, further comprising a batched network coding (BNC) encoder configured to:
generate the optimum number of packets based on the file; and
encode, by the BNC encoder, the optimum number of packets according to a particular batch size corresponding to the optimum number of packets.

18. The apparatus of claim 17, wherein the BNC encoder is configured to:
perform BNC recoding on a batch of input packets to produce a recoded batch of input packets; and
transmit the recoded batch of input packets to a device, wherein the device is another node of the network or a destination device.

19. The apparatus of claim 15, wherein the optimization engine is configured to estimate the overhead information based on the batch size.

20. The apparatus of claim 15, wherein the optimization engine is configured to:

determine an initial number of packets for transmitting based on the batch size;
update the overhead information based on the initial number of packets for transmitting the file; and
revise the total number of packets based on the overhead information.

\* \* \* \* \*